United States Patent
Kodeboina et al.

(10) Patent No.: US 10,051,047 B2
(45) Date of Patent: Aug. 14, 2018

(54) LOAD-BALANCING SERVER FOR DATA TRANSFORMATION MODULES

(71) Applicant: Anthelio Healthcare Solutions Inc., Dallas, TX (US)

(72) Inventors: Kiran Kumar Kodeboina, Freemont, CA (US); Dan B. Ayala, San Ramon, CA (US); Cynthia G. Nicholas, Lake Orion, MI (US); Brenda S. Ikerd, Prairieville, LA (US)

(73) Assignee: ATOS DIGITAL HEALTH SOLUTIONS, INC., Dallas, TX (US)

( * ) Notice: Subject to any disclaimer, the term of this patent is extended or adjusted under 35 U.S.C. 154(b) by 142 days.

(21) Appl. No.: 14/885,012

(22) Filed: Oct. 16, 2015

(65) Prior Publication Data
US 2017/0111281 A1    Apr. 20, 2017

(51) Int. Cl.
*G06F 15/173*    (2006.01)
*H04L 29/08*    (2006.01)

(52) U.S. Cl.
CPC ............................... *H04L 67/1029* (2013.01)

(58) Field of Classification Search
CPC ......... H04L 47/00; H04L 47/10; H04L 47/12; H04L 47/125
USPC ....... 709/201, 202, 203, 205, 213, 214, 216, 709/217, 218, 219, 222, 223, 224, 225, 709/226
See application file for complete search history.

(56) References Cited

U.S. PATENT DOCUMENTS

| | | | | |
|---|---|---|---|---|
| 5,557,515 A | * | 9/1996 | Abbruzzese | G06Q 10/06311 705/7.15 |
| 6,115,646 A | * | 9/2000 | Fiszman | G06F 9/465 700/104 |
| 7,106,835 B2 | * | 9/2006 | Saalsaa | G16H 40/20 379/45 |
| 8,447,627 B1 | * | 5/2013 | Cruise | G06F 19/328 705/2 |
| 9,037,631 B2 | * | 5/2015 | Dietrich | H04L 67/10 709/201 |
| 2002/0026329 A1 | * | 2/2002 | Saito | G06F 19/325 705/3 |
| 2002/0152305 A1 | * | 10/2002 | Jackson | H04L 43/00 709/224 |
| 2004/0049292 A1 | * | 3/2004 | Weigand | G11B 27/02 700/2 |
| 2004/0073458 A1 | * | 4/2004 | Jensen | G06Q 10/10 705/2 |
| 2004/0189718 A1 | * | 9/2004 | Stein | G06F 19/322 715/853 |

(Continued)

*Primary Examiner* — Davoud Zand
(74) *Attorney, Agent, or Firm* — Miles & Stockbridge P.C.

(57) ABSTRACT

Embodiments disclosed herein may be directed to a load-balancing server. In some embodiments, the load-balancing server comprises: at least one memory comprising instructions; at least one processing device configured for executing the instructions; and a load-balancing module, coupled to the at least one memory, the at least one processing device, and at least one data transformation module, and configured for: determining a first amount of computing resources for allocating to the at least one data transformation module using a load-balancing technique, wherein the at least one data transformation module is coupled to the at least one memory, the at least one processing device, and the load-balancing module.

20 Claims, 7 Drawing Sheets

(56) References Cited

U.S. PATENT DOCUMENTS

| | | | |
|---|---|---|---|
| 2005/0108045 A1* | 5/2005 | Gong | G06Q 50/22 705/2 |
| 2005/0203771 A1* | 9/2005 | Achan | G06Q 10/103 705/2 |
| 2006/0229896 A1* | 10/2006 | Rosen | G06Q 10/1053 705/321 |
| 2007/0050219 A1* | 3/2007 | Sohr | G06Q 40/08 705/4 |
| 2007/0203750 A1* | 8/2007 | Volcheck | G06F 19/328 705/2 |
| 2008/0086327 A1* | 4/2008 | Cox | G06F 19/325 705/2 |
| 2008/0120462 A1* | 5/2008 | Nehse | G06F 3/0605 711/114 |
| 2009/0150534 A1 | 6/2009 | Miller et al. | |
| 2012/0010900 A1* | 1/2012 | Kaniadakis | G06F 19/328 705/2 |
| 2012/0134328 A1* | 5/2012 | Gauvreau | H04L 5/0037 370/329 |
| 2014/0081652 A1* | 3/2014 | Klindworth | G06Q 10/10 705/2 |
| 2014/0280595 A1* | 9/2014 | Mani | H04L 12/1827 709/204 |
| 2015/0020132 A1* | 1/2015 | Willis | H04L 47/76 725/110 |
| 2015/0365462 A1* | 12/2015 | Jenkins | G06F 17/30899 709/217 |

\* cited by examiner

| 702 | 704 | 706 | 708 | 710 | 712 | 714 | 716 |
|---|---|---|---|---|---|---|---|
| NAME | HISTORY | INPUTTED CLASSIFICATION CODE | SUBMITTED CLASSIFICATION CODE | NARRATIVE | NOTIFICATION | CLARIFICATION | EVALUATION |
| NAME 1 | HISTORY 1 | INPUTTED CLASSIFICATION CODE 1 | SUBMITTED CLASSIFICATION CODE 1 | NARRATIVE 1 | NOTIFICATION 1 | CLARIFICATION 1 | EVALUATION 1 |
| NAME 2 | HISTORY 2 | INPUTTED CLASSIFICATION CODE 2 | SUBMITTED CLASSIFICATION CODE 2 | NARRATIVE 2 | NOTIFICATION 2 | CLARIFICATION 2 | EVALUATION 2 |
| NAME 3 | HISTORY 3 | INPUTTED CLASSIFICATION CODE 3 | SUBMITTED CLASSIFICATION CODE 3 | NARRATIVE 3 | NOTIFICATION 3 | CLARIFICATION 3 | EVALUATION 3 |
| NAME 4 | HISTORY 4 | INPUTTED CLASSIFICATION CODE 4 | SUBMITTED CLASSIFICATION CODE 4 | NARRATIVE 4 | NOTIFICATION 4 | CLARIFICATION 4 | EVALUATION 4 |

LOAD-BALANCING SERVER FOR DATA TRANSFORMATION MODULES

TECHNICAL FIELD

Embodiments disclosed herein relate to a load-balancing server for data transformation modules and are appropriately classified in USPC 706/020.

BACKGROUND

When a medical service provider provides a service to a patient, the service provided to the patient may be documented for billing and/or insurance purposes. In some embodiments, the service provided to the patient may be coded into an electronic billing system using one or more classification codes, such as codes associated with the International Statistical Classification of Diseases and Related Health Problems (e.g., ICD-9 codes and/or ICD-10 codes). These classification codes may enable healthcare professionals and/or an insurance companies to correctly identify, document, and/or bill the provided service.

However, as the healthcare industry transitions from utilizing a first set of classification codes to utilizing a second set of classification codes (e.g., from utilizing ICD-9 codes to utilizing ICD-10 codes), medical service providers and/or insurance companies may be faced with a variety of challenges. For example, a medical service provider may incorrectly and/or incompletely code a provided service, particularly if the medical service provider uses the first set of classification codes to code the provided service when coding of the provided service using the second set of classification codes is required by law.

SUMMARY

Briefly, aspects of the present invention relate to improved data transformation through the use of load balancing servers. The load-balancing server comprises: at least one memory comprising instructions; at least one processing device configured for executing the instructions; and a load-balancing module, coupled to the at least one memory, the at least one processing device, and at least one data transformation module, and configured for: determining a first amount of computing resources for allocating to the at least one data transformation module using a load-balancing technique, wherein the at least one data transformation module is coupled to the at least one memory, the at least one processing device, and the load-balancing module.

In some embodiments, another load-balancing server is provided. The load-balancing server comprises: at least one memory comprising instructions; at least one processing device configured for executing the instructions; a first module, coupled to the at least one memory and the at least one processing device, and configured for: receiving, from a first user device, a classification code associated with a provided medical service; transmitting, to a second user device, the classification code; receiving, from the second user device, a notification associated with the classification code, wherein the notification comprises an identifier of an error associated with the classification code; and transmitting, to the first user device, the notification; a second module, coupled to the at least one memory and the at least one processing device, and configured for: transmitting, to a third user device, the classification code and the notification; receiving, from the third user device, a clarification associated with the classification code and the notification, wherein the clarification comprises an identifier of at least one error associated with at least one of the classification code and the notification; and transmitting the clarification to the second user device; a third module, coupled to the at least one memory and the at least one processing device, and configured for: transmitting, to a fourth user device, the classification code, the notification, and the clarification; receiving, from the fourth user device, a compliance review associated with the classification code, the notification, and the clarification, wherein the compliance review comprises an identifier of at least one error associated with at least one of the classification code, the notification, and the clarification; a fourth module, coupled to the at least one memory and the at least one processing device, and configured for: generating a report based at least in part on the compliance review; transmitting the report to at least one of the first user device, the second user device, the third user device, and the fourth user device; and a fifth module, coupled to the at least one memory, the first module, the second module, the third module, and the fourth module, and configured for: determining a first amount of processing power to be allocated to at least one of the first module, the second module, the third module, and the fourth module based on a second amount of processing power allocated to at least one of the first module, the second module, the third module, and the fourth module.

BRIEF DESCRIPTION OF THE DRAWINGS

Reference is now made to the following detailed description, taken in conjunction with the accompanying drawings. It is emphasized that various features may not be drawn to scale and the dimensions of various features may be arbitrarily increased or reduced for clarity of discussion. Further, some components may be omitted in certain figures for clarity of discussion.

FIG. 7 shows an exemplary report generated by the fourth module, in accordance with some embodiments of the disclosure.

Although similar reference numbers may be used to refer to similar elements for convenience, it can be appreciated that each of the various example implementations may be considered distinct variations.

DETAILED DESCRIPTION

Introduction

Embodiments of the present disclosure may be directed to a system that enables real-time inputting and reviewing, as well as auditing and/or reporting, of classification codes associated with provided medical services. Multiple users may utilize the system to ensure that each classification code associated with a provided medical service is complete, accurate, and compliant with regulatory laws and guidelines. The system may also include a load-balancing functionality that intelligently distributes processing power and/or resources required for processing a particular volume of classification codes based on a variety of factors.

Illustrative Example

For example, after a doctor provides a medical service to a patient, the doctor may utilize the system disclosed herein to input a classification code associated with the medical service provided to the patient. The classification code may include a code associated with the International Statistical Classification of Diseases and Related Health Problems (e.g., ICD-9 codes and/or ICD-10 codes) and may be utilized for billing and/or insurance purposes.

Once inputted and prior to submission of the classification code to formal billing and/or insurance processes, the classification code may be reviewed in real time by a reviewer (e.g., a coder, a billing specialist, and/or the like) to ensure accuracy of the classification code. If the classification code is determined to be incomplete and/or inaccurate, the reviewer may modify the classification code, as well as provide to the doctor a notification identifying any determined issues. The notification may provide the doctor with information to potentially eliminate recurrence of the determined issue(s) when inputting future classification codes. If the classification code is determined to be complete and accurate, the reviewer may submit the classification code to formal billing and/or insurance processes after receiving supervisory approval.

After submission, the classification code may be selected for an auditing process. An auditor may review the classification code inputted by the doctor, the classification code submitted by the reviewer, any determined issue(s) associated with the classification code, any modifications made to the classification code, the notification provided to the doctor, and/or any other information associated with a record of the provided medical service. The auditor may generate a compliance review of the classification code to evaluate completeness and accuracy of the content of the classification code and the notification, as well as performance of the doctor and the reviewer. The auditor may then generate and distribute a report including a variety of analyses associated with the classification code, the notification, the doctor, and/or the reviewer so that future submissions of classification codes continue to become more complete and accurate.

System Environment

Figure 1:
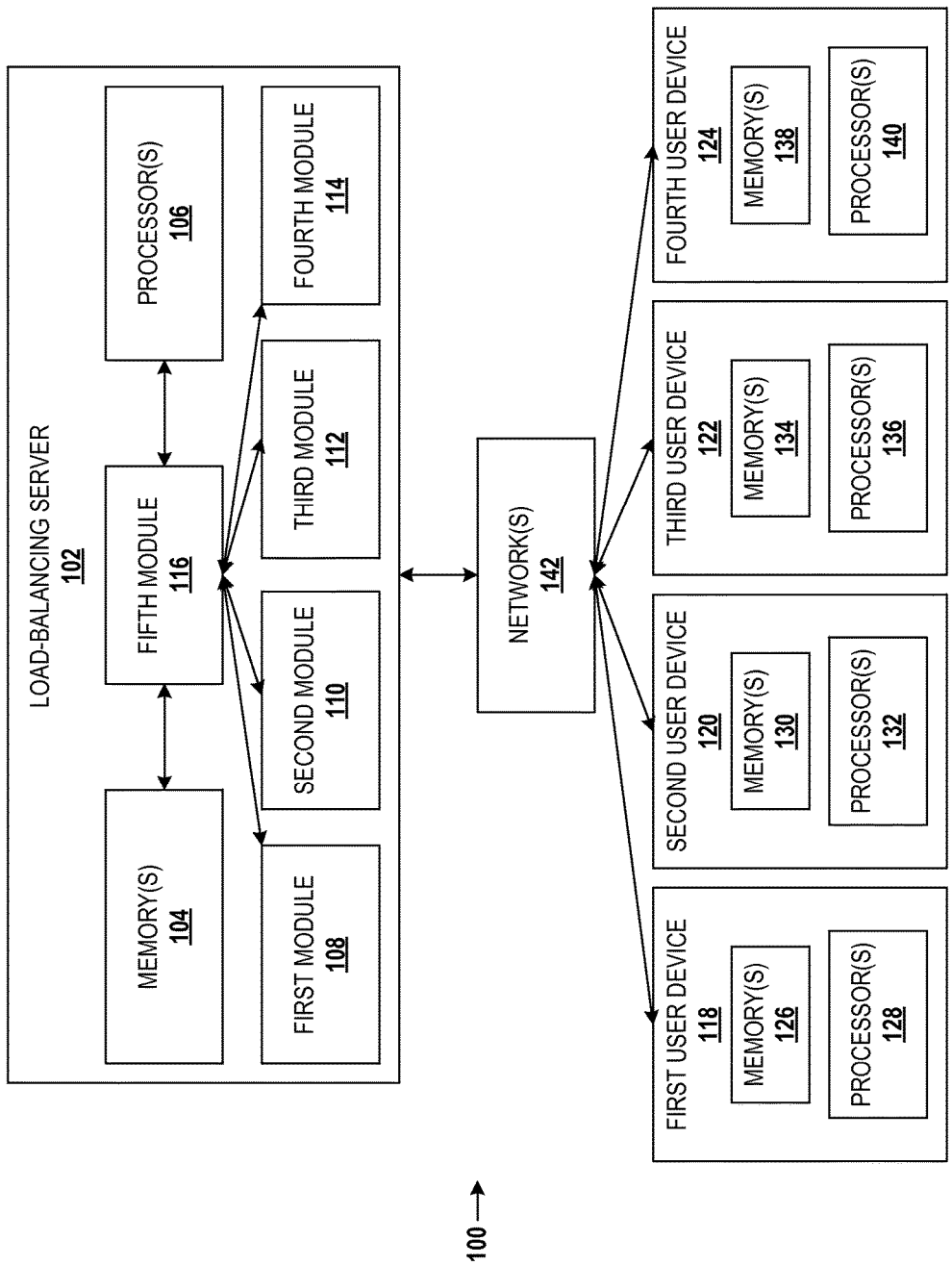
FIG. 1 shows an exemplary system environment, in accordance with some embodiments of the disclosure.

Referring now to the Figures, FIG. 1 illustrates an exemplary system 100 for enabling real-time inputting and reviewing, as well as auditing and/or reporting, of classification codes associated with provided medical services. In some embodiments, the system 100 may include a load-balancing server 102, which may include a plurality of servers 102 configured to communicate with one another and/or implement load-balancing techniques described herein.

The load-balancing server 102 may include one or more memories 104 and/or one or more processors 106. In some embodiments, The load-balancing server 102 may also include a communication unit, an I/O module, one or more user device APIs, one or more database APIs, and/or the like.

The one or more memories 104 may include random access memory (RAM), read only memory (ROM), and/or various forms of secondary storage. RAM may be used to store volatile data and/or to store instructions that may be executed by the one or more processors 104. For example, the data stored may be a command, a current operating state of the load-balancing server 102, an intended operating state of the load-balancing server 102, and/or the like. As a further example, data stored in the one or more memories 104 may include instructions related to various methods and/or functionalities described herein. ROM may be a non-volatile memory device that may have a smaller memory capacity than the memory capacity of a secondary storage. ROM may be used to store instructions and/or data that may be read during execution of computer instructions. Access to both RAM and ROM may be faster than access to secondary storage. Secondary storage may be comprised of one or more disk drives or tape drives and may be used for non-volatile storage of data or as an over-flow data storage device if RAM is not large enough to hold all working data. Secondary storage may be used to store programs that may be loaded into RAM when such programs are selected for execution. In some embodiments, the one or more memories 104 may include one or more databases for storing medical records, various pieces of information associated with a provided medical service, and/or the like. In some embodiments, the one or more memories 104 may store any data described herein. Additionally or alternatively, one or more secondary databases located remotely from the load-balancing server 102 may be utilized, accessed, and/or the like.

The one or more processors 106 may control any of the one or more modules and/or functions performed by the various modules in the load-balancing server 102 and/or the one or more user devices. Any actions described as being taken by a processor may be taken by the one or more processors 106 alone or by the one or more processors 106 in conjunction with one or more additional processors and/or modules. Additionally, while only one processor of the one or more processors 106 may be shown, multiple processors may be present. Thus, while instructions may be described as being executed by the one or more processors 106, the instructions may be executed simultaneously, serially, or otherwise by one or multiple processors 106 (and/or processor(s) 128, 132, 136, 140). The one or more processors 106 may be implemented as one or more computer processing unit (CPU) chips and/or graphical processing unit (GPU) chips and may include a hardware device capable of executing computer instructions. The one or more processors 106 may execute instructions, codes, computer programs, or scripts. The instructions, codes, computer programs, or scripts may be received from the one or more memories 104 (and/or memories 126, 130, 134, 138), from an I/O module, from a communication unit, and/or the like.

In some embodiments, the load-balancing server 102 may include separate application programming interfaces (APIs) for communicating with the one or more user devices 118, 120, 122, 124, the one or more memories 104, and/or another system and/or device. A mobile device API may provide a connection for communicating with the one or more user devices 118, 120, 122, 124. A database API may provide a connection for communicating with the one or more memories 104 and/or another database. Each API may be associated with a customized physical circuit. The load-balancing server 102 may not include a generic computing system, but instead may include a customized computing system designed to perform the various methods described herein.

The load-balancing server 102 may further include one or more modules. For example, the load-balancing server 102 may include a first module 108, a second module 110, a third module 112, a fourth module 114, and/or a fifth module 116. In some embodiments, each of the first module 108, the second module 110, the third module 112, the fourth module 114, and/or the fifth module 116 may be operatively coupled to and/or utilize the one or more memories 104 and/or the one or more processors 106 of the load-balancing server for performing particular operations associated with real-time inputting and reviewing, as well as auditing and/or reporting, of classification codes associated with provided medical services. Each of the first module 108, the second module 110, the third module 112, the fourth module 114, and/or the fifth module 116 may also include specially-purposed hardware and/or computer-executable instructions for performing particular operations associated with real-time inputting and reviewing, as well as auditing and/or reporting, of classification codes associated with provided medical services. The load-balancing server 102 may be configured to receive, retrieve, transmit, store, delete, modify, and/or otherwise transform any information described herein.

The system 100 may include one or more user devices. For example, the system 100 may include a first user device 118, a second user device 120, a third user device 122, and/or a fourth user device 124. Each of the first user device 118, the second user device 120, the third user device 122, and/or the fourth user device 124 may be utilized by one or more users for performing particular operations associated with real-time inputting and reviewing, as well as auditing and/or reporting, of classification codes associated with provided medical services. For example, the first user device 118 may include one or more memories 126 and/or one or more processors 128; the second user device 120 may include one or more memories 130 and/or one or more processors 132; the third user device 122 may include one or more memories 134 and/or one or more processors 136; and/or the fourth user device 124 may include one or more memories 138 and/or one or more processors 140. In some embodiments, components of each of the first user device 118, the second user device 120, the third user device 122, and/or the fourth user device 124 may include one or more similar elements as those described above (e.g., a communication unit, APIs, and/or the like) as being included, in some embodiments, in the load-balancing server 102.

Each of the first user device 118, the second user device 120, the third user device 122, and/or the fourth user device 124 may also include various input and/or output devices for enabling one or more users to interact with each user device. For example, each of the user devices 118, 120, 122, 124 may include a keyboard, a mouse, a touchpad, a touchscreen, a camera, a microphone, a radio frequency identification (RFID) scanner, a display, a monitor, a speaker, and/or the like configured to receive input from and/or display output to one or more users. Each of the user devices 118, 120, 122, 124 may also include various pieces of hardware for communicating between other user devices and/or with the load-balancing server.

The load-balancing server 102 and/or any user device 118, 120, 122, 124 may include one or more radio transceivers, chips, analog front end (AFE) units, antennas, processing units, memory, other logic, and/or other components to implement communication protocols (wired or wireless) and related functionality for facilitating communication between the load-balancing server 102 and/or any of the user devices 118, 120, 122, 124. As a further example, a communication unit may include modems, modem banks, Ethernet devices, universal serial bus (USB) interface devices, serial interfaces, token ring devices, fiber distributed data interface (FDDI) devices, wireless local area network (WLAN) devices or device components, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other devices for communication. Communication protocols may include WiFi, Bluetooth®, WiMAX, Ethernet, powerline communication (PLC), and/or the like. In some embodiments, communicating between any of the devices (e.g., the load-balancing server 102 and/or the user devices 118, 120, 122, 124) may include transforming and/or translating data from being compatible with a first communication protocol to being compatible with a second communication protocol.

Further, each of the first user device 118, the second user device 120, the third user device 122, and/or the fourth user device 124 may communicate with the load-balancing server 102 via one or more networks 142. In some embodiments, the one or more networks 142 may include any wireless and/or wired communications network that facilitates communication between the load-balancing server 102 the first user device 118, the second user device 120, the third user device 122, and/or the fourth user device 124. For example, the one or more networks may include an Ethernet network, cellular network, a computer network, the Internet, a Wi-Fi network, a Bluetooth network, an RFID network, an NFC network, and/or the like.

User Definitions

In some embodiments, a first user may include a medical service provider. For example, the first user may include a doctor, a dentist, a surgeon, a specialist, a physician's assistant, a nurse, and/or any other medical professional. Additionally, the first user may also include an administrator of a medical service provider, an assistant, and/or the like. In some embodiments, the first user may include multiple users.

In some embodiments, a second user may include a coder of medical services. For example, the second user may include a billing specialist or coordinator, an accountant, an administrator of a medical service provider, a client relationship liaison, and/or the like. In some embodiments, the second user may include multiple users.

In some embodiments, a third user may include a supervisor of the second user. For example, the third user may include a billing manager, an account manager, an administrator of a medical service provider, a client relationship manager, and/or the like. In some embodiments, the third user may include multiple users.

In some embodiments, a fourth user may include an auditor. For example, the fourth user may include a third party auditor, an internal auditor, an analyst, an administrator of a medical service provider, and/or the like. In some embodiments, the fourth user may include multiple users.

System Operation

After a medical service (e.g., an office visit, a consultation, an operation, therapy, and/or the like) has been provided to a patient, the provided medical service (and/or a diagnosis associated with the provided medical service) may be documented and/or otherwise recorded for billing and/or insurance purposes. Accordingly, the first user may utilize the first user device 118 to input a classification code associated with a provided medical service. For example, the first user may input a particular classification code, such as an ICD-10 code associated with the provided medical service and/or a written narrative describing details of the provided medical service, using the one or more input devices included in the first user device 118 described above. In some embodiments, inputting the classification code may also include inputting a plurality of classification codes, inputting information associated with the provided medical service and/or the patient such as demographic information, patient information, contact information, and/or the like. The inputted classification code may be received by the first user device 118 and then transmitted from the first user device 118 to the first module 108 of the load-balancing server 102 via the one or more networks 142.

After receiving the inputted classification code, the first module 108 may store the inputted classification code in the one or more memories 104. The first module 108 may also input the inputted classification code into a queue of classification codes that are to be processed and/or submitted via the system 100.

Prior to formal submission of the inputted classification code, the first module 108 may transmit the inputted classification code and/or the associated narrative (e.g., any information associated with the provided medical service such as medical record information, patient information, and/or the like) to the second user device 120 via the one or more networks 142 for review by the second user. The second user may utilize the one or more output devices of the second user device 120 to review the inputted classification code. For example, the second user may analyze the inputted classification code for completeness and/or accuracy.

If the second user determines that the inputted classification code is incomplete and/or inaccurate, or requires updating from a first set of codes to a second set of codes, the second user may modify, delete, add, and/or replace the inputted classification code with a second classification code using the second user device 120. For example, the second user may determine that the inputted classification code includes an out-of-date (and/or otherwise noncompliant) ICD-9 code, and thus may replace the ICD-9 code with an ICD-10 code using the second user device 120. As another example, the second user may determine that the inputted classification code does not include an ICD-10 code and instead only includes a written narrative describing the provided medical service, and thus may select a corresponding ICD-10 code using the second user device 120. As a third example, the second user may determine that the inputted classification code is incomplete, and thus may request additional information from the first user so that an appropriate classification code may be selected.

Conversely, if the second user determines that the inputted classification code is complete and/or accurate, then the second user may provide approval of the inputted classification code using the second user device 120. In some embodiments, approval of the classification code may be required from a plurality of second users prior to submission of the classification code.

In some embodiments, the first module 108 and/or the second user device 120 may be enabled to perform automated analyses of the inputted classification code. For example, the first module 108 and/or the second user device 120 may be configured to automatically perform a text analysis of the inputted classification code and/or a provided narrative, identify one or more errors associated with the inputted classification code and/or a provided narrative, and provide a recommendation for modifying the inputted classification code to the second user device 120 for review prior to submission of the classification code. During an analysis of the inputted classification code, the first module 108 and/or the second user device 120 may retrieve, receive, and/or otherwise access information stored in one or more databases internal to and/or external to the system 100.

During and/or after review of the inputted classification code, the second user device 120 may further enable the second user to input a notification associated with the inputted classification code. In some embodiments, the notification may include information associated with the review of the inputted classification code. For example, the notification may identify any errors identified during the review of the classification code and/or any modifications of the classification code. In some embodiments, the notification may include comments, notes, identification of errors, and/or recommendations of modifications associated with the inputted classification code and/or other inputted information. As used herein, comments may include any of the aforementioned information types, as well as text, numerical data, and/or the like.

Once inputted, the notification may be transmitted from the second user device 120 to the second module 108 of the load-balancing server 102. Accordingly, the second module 110 may receive the notification from the second user device 120. After receipt and prior to submission of the classification code, the second module 110 may transmit the notification to the third user device 122 for review by the third user. Alternatively, the notification may be transmitted directly from the second user device 120 to the third user device 122.

In some embodiments, the third user may utilize the one or more output devices of the third user device 122 to review the notification. For example, the third user may analyze the notification for completeness and/or accuracy to ensure that information included in the notification and provided by second user is complete and accurate prior to transmission of the notification to the first user device 118 for review by the first user.

If the third user determines that information included in the notification is incomplete and/or inaccurate, the third user may modify, delete, add, and/or replace one or more pieces of information included in the notification. For example, the third user may determine that the notification includes information indicating that the second user updated a noncompliant ICD-9 code with an incorrect ICD-10 code, and thus may replace and/or suggest replacement of the incorrect ICD-10 code with a correct ICD-10 code using the third user device 122.

Conversely, if the third user determines that the notification is complete and/or accurate, then the third user may provide approval of the notification using the third user device 122. In some embodiments, approval of the notification may be required from a plurality of third users prior to transmission of the notification to the first user and/or submission of the classification code for billing and/or insurance processing.

In some embodiments, the second module 110 and/or the third user device 122 may be enabled to perform automated analyses of the notification. For example, the second module 110 and/or the third user device 122 may be configured to automatically perform a text analysis of the notification and/or the classification code (as well as any associated information and/or narrative), identify one or more errors associated with the notification and/or the classification code, and provide a recommendation for modifying the notification to the third user device 122 for review prior to transmission of the notification to the first user device 118. During an analysis of the inputted classification code, the second module 110 and/or the third user device 122 may retrieve, receive, and/or otherwise access information stored in one or more databases internal to and/or external to the system 100.

During and/or after review of the notification, the third user device 122 may further enable the third user to input a clarification associated with the notification. In some embodiments, the clarification may include information associated with the review of the notification. For example, the clarification may identify any errors identified during the review of the notification and/or any modifications of the classification code. The clarification may also provide approval of the notification and/or the classification code.

The clarification may be transmitted from the third user device 122 to the second module 110 and/or another module of the load-balancing server 102 for distribution to one or more user devices, or may be transmitted directly to the second user device 120 for review by the second user prior to transmission of the notification to the first user device 118.

The second user device 120 may receive the clarification from either from the second module 110 and/or the third user device 122. The second user may utilize the one or more output devices of the second user device 122 to review the clarification. In this manner, the clarification may provide to the second user information associated with the review of the notification. The second user may utilize the second user device 122 to approve and/or modify the notification and/or the classification code based on information included in the clarification. The second user may use information included in the clarification to improve future notification inputs, avoid particular notification and/or coding errors, and/or the like. Ultimately, providing the second user with the clarification prior to transmission of the notification to the first user device 118 and/or submission of the classification code may increase completeness and/or accuracy of future notification and/or classification code inputs. The second user may then, using the second user device 120, the first module 109, and/or the second module 110, submit the classification code for billing and/or insurance processing.

Additionally, once approved by the second user and/or the third user, the notification may then be transmitted to the first user device 118. The first user device 118 may receive the notification from either from the first module 108, the second module 110, the second user device 120, and/or the third user device 122. The first user may utilize the one or more output devices of the first user device 118 to review the notification. In this manner, the notification may provide to the first user information associated with the review of the inputted classification code. The first user may also use information included in the notification to improve future classification code inputs, avoid particular coding errors, and/or the like. Ultimately, providing the first user with the notification may increase completeness and/or accuracy of future classification code inputs. Further, because the inputted classification code, any associated information and/or narrative, the notification, and/or the clarification may all be processed as described herein prior to submission of the classification code for billing and/or insurance purposes, these processes may take place in real time and/or near real time.

After submission of the classification code to billing and/or insurance processing, the first module 108, the second module 110, and/or any of the first user device 118, the second user device 120, and/or the third user device 122 may transmit the inputted classification code, the submitted classification code, any information and/or narratives associated with the classification code and/or the provided medical service, the notification, and/or the clarification to the third module 112 and/or the fourth module 114.

In some embodiments, the classification code may be randomly selected from an amassed listing and/or database of submitted classification codes by the fourth user using the fourth user device 124 for auditing purposes. In response, the third module 112 may transmit information associated with the classification code to the fourth user device 124 for auditing. The fourth user device 124 may receive this information, and the fourth user may utilize the one or more output devices of the fourth user device 124 to review this information. For example, the fourth user may analyze the classification code and all associated information (e.g., the notification, the clarification, and/or the like) for completeness, accuracy, and/or compliance with regulatory guidelines and/or laws to ensure that the classification code, as well as the reviewing processes described herein, is complete, accurate, and/or compliant with regulations. As a product of this review, the fourth user may generate a compliance review that includes information associated with the completeness, accuracy, and/or compliance of the submitted classification code, as well as an evaluation of the performance of any and all users involved in the coding processes (e.g., the first user, the second user, and/or the third user). In some embodiments, a predetermined percentage of all submitted classification codes may be audited at random.

If, during review and/or analysis, the fourth user determines that the submitted classification code is incomplete, inaccurate, and/or otherwise noncompliant, the fourth user may, using the fourth user device 124, input information indicating any identified errors. Conversely, if the fourth user determines that the submitted classification code is complete, accurate, and/or otherwise compliant, then the fourth user may, using the fourth user device 124, provide approval submitted classification code. In some embodiments, the fourth user may, using the fourth user device 124, provide comments regarding coding regulations, suggestions for improving efficiency of the coding process, performing grades and/or scores associated with a level of achieved performance of each user involved in the coding process, and/or the like. In some embodiments, this provided input may be included in the compliance review of the classification code.

In some embodiments, the third module 112 and/or the fourth user device 124 may be enabled to perform automated analyses of the submitted classification code and/or associated information. For example, the third module 112 and/or the fourth user device 124 may be configured to automatically perform a text analysis of the submitted classification code (as well as any associated information, narrative, notification, clarification, and/or the like), identify one or more errors associated with the submitted classification code, and provide a recommendation for modifying the coding process to result in a more complete, accurate, compliant, and/or otherwise efficient coding of the provided medical service. This recommendation may be included in the compliance review. During an analysis of the submitted classification code and/or its associated information described herein, the third module 112 and/or the fourth user device 124 may retrieve, receive, and/or otherwise access information stored in one or more databases internal to and/or external to the system 100.

In some embodiments, the compliance review may be transmitted from the fourth user device 124 and/or the third module 112 for distribution to any of the first user device 118, the second user device 120, and/or the third user device 122 for respective user review.

In some embodiments, the fourth user (and/or another user) may utilize the fourth module 114 to generate a report associated with the classification code. For example, the report may include a summary, charts, graphs, and/or analytics based on the coding process of the submitted classification code. In some embodiments, the fourth module 114 may utilize information associated with the first user, the second user, the third user, the fourth user, the inputted classification code, the submitted classification code, the notification, the clarification, the compliance review, and/or any other information associated with the provided medical service to generate the report. In some embodiments, the report may include a number of inputted classification codes, a number of submitted classification codes, a number of notifications, a number of clarifications, and/or the like. Information included in the report may be sorted based on a variety of factors such as a medical provider type, a classification code, a disease diagnosis, a treatment type, a hospital, a notification type, a clarification type, a search history, and/or the like. The report may be transmitted from the fourth module 114 to any of the user devices 118, 120, 122, 124 and/or another system external to the system 100 for review and/or further processing.

In some embodiments, the load-balancing server 102 may be configured for processing a high volume of classification codes inputted by a large number of users. As such, limited computing resources of the load-balancing server 102 such as memory, processing power, and/or the like may be in high demand at various times during processing. Accordingly, the fifth module 116 may be configured to manage the allocation of computing resources as they are needed by particular elements (e.g., the one or more memories 104, the one or more processors 106, and/or the one or more modules 108, 110, 112, 114, 116) of the load-balancing server 102. In some embodiments, the fifth module 116 may include specially-purposed hardware for monitoring performance of each element of the load-balancing server 102, as well as for responding to the computing resource needs of each element. For example, the fifth module 116 may include and/or be included in a load-balancing server separate and distinct from the load-balancing server 102. In some embodiments, the fifth module 116 may also include one or more hardware-based communication devices to enable communication between the fifth module 116 and at least one of the first module 108, the second module 110, the third module 112, and/or the fourth module 114.

For example, the fifth module 116 may determine a number of inputted classification codes that have been placed in the queue and are waiting to be processed. The fifth module 116 may then determine that the number of inputted classification codes in the queue meets and/or exceeds a predetermined threshold value. Based on determining that the number of inputted classification codes in the queue meets and/or exceeds the predetermined threshold value, the fifth module 116 may determine an amount of additional processing power required by the first module 108, the second module 110, the third module 112, and/or the fourth module 114 for processing the inputted classification codes in the queue. The fifth module 116 may then allocate the determined amount(s) of processing power to the first module 108, the second module 110, the third module 112, and/or the fourth module 114.

In some embodiments, factors affecting the allocation of computing resources by the fifth module 116 may include a volume of classification codes to be processed by the load-balancing server 102, a duration of time during which computing resources are required by one or more elements of the load-balancing server 102, and/or the like. In some embodiments, computing resources may be allocated to and/or distributed amongst a plurality of load-balancing servers included in the load-balancing server 102 based on one or more factors. In some embodiments, allocating computing resources may include flipping a switch, adjusting processing power, adjusting memory size, partitioning a memory element, controlling one or more input and/or output devices, and/or the like. For example, additional memory in the one or more memories 104 may be allocated for use by a particular data transformation module that requires additional memory in order to effectively process a high volume of classification codes. In some embodiments, the load-balancing server 102 may utilize parallel processing techniques such as dedicating a plurality of processors included in the one or more processors 106 for processing a high volume of classification codes by a particular data transformation module of the load-balancing server 102. The load-balancing server 102 may also transmit data to another system and/or a second load-balancing server for processing.

In some embodiments, inputted classification codes and/or associated information may be received by the load-balancing server 102 (and/or one or more modules of the load-balancing server 102) in a first format. The load-balancing server 102 may convert the inputted classification codes and/or associated information from the first format to a second format prior to processing and/or storage.

In some embodiments, inputted classification codes and/or associated information that is transmitted between one or more elements of the system 100 may be encoded, encrypted, decoded, decrypted, and/or the like. An encryption key used to encrypt data, for example, may be transmitted substantially simultaneously to any transmission of data so that a receiving device may decrypt encrypted data.

In some embodiments, the load-balancing server 102 may transform data from one form (e.g., a user device communication protocol) to another form (e.g., a database communication protocol), and/or vice versa, to enable the load-balancing server 102 to communicate with the user devices, the one or more memories 104, and/or other devices and/or systems.

In some embodiments, a dashboard interface and/or similar portal may be provided. One or more users may access the dashboard interface using one or more of the user devices described herein and/or another device. User authentication, such as single and/or dual authentication, may be required for a user to access the dashboard interface.

Method Descriptions

Figure 2:
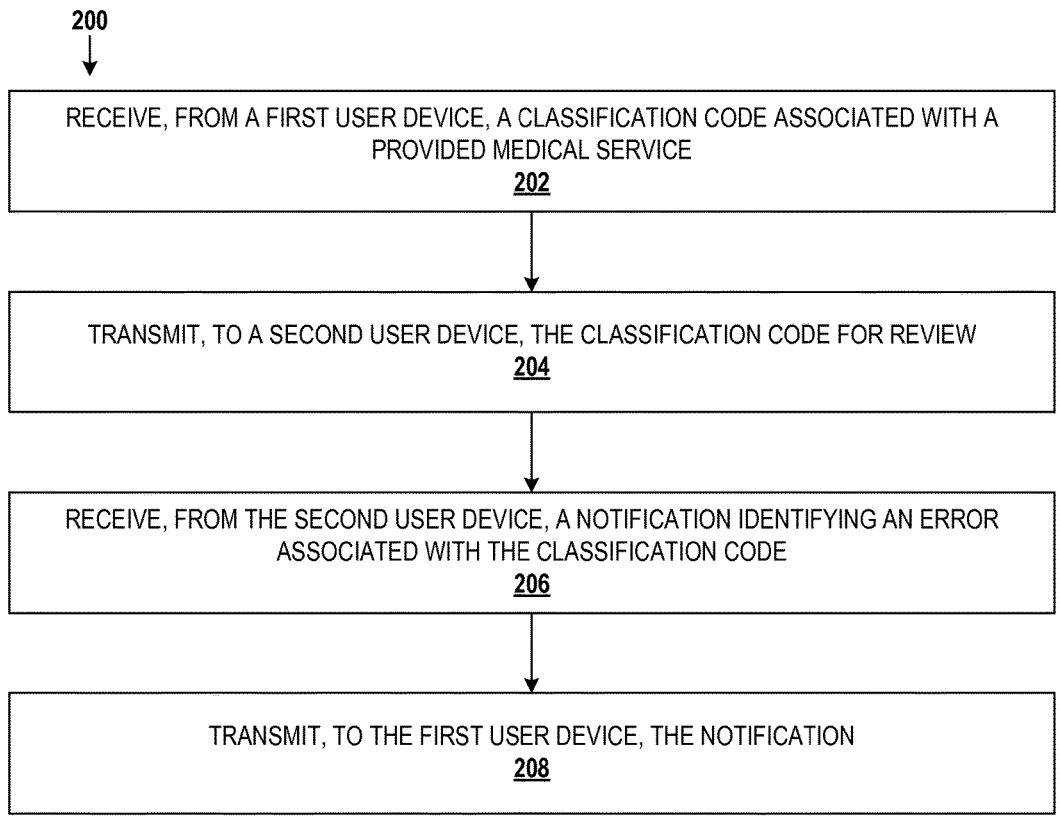
FIG. 2 shows an exemplary method of performing operations associated with the first module, in accordance with some embodiments of the disclosure.

FIG. 2 shows an exemplary method 200 for performing operations associated with the first module 108. For example, method 200 may correspond to operations performed using the load-balancing server 102 (e.g., the first module 108), the first user device 118, and/or the second user device 120. At block 202, the method 200 may include receiving, from the first user device, a classification code associated with a provided medical service. For example, the first user (e.g., a medical provider) may input information (e.g., a classification code, a narrative, and/or other information) associated with a provided medical service into the system 100 using the first user device 118, which then transmits the inputted information to the load-balancing server 102 for processing by the first module 108. At block 204, the method 200 may include transmitting, to the second user device, the classification code for review. For example, the first module 108 may transmit the inputted information associated with the provided medical service to the second user device 120 for review by the second user (e.g., a coder).

With further reference to FIG. 2, the process continues at block 206, where the method 200 may include receiving, from the second user device, a notification identifying an error associated with the classification code. For example, the second user, using the second user device 120, may review the inputted information to identify one or more errors associated with an inputted classification code and/or narrative. The notification may be generated by the second user device 120 after review of the inputted information is complete. The notification may be transmitted from the second user device 120 to the load-balancing server 102 for processing by the first module 108 (and/or any other module described herein). At block 208, the method 200 may include transmitting, to the first user device, the notification. For example, the first module 108, upon receipt of the notification from the second user device 120, may transmit the notification to the first user device 118 so that the first user may review the notification. In this manner, comments, notes, identification of one or more errors, and/or recommendations of modifications associated with the inputted information is provided to the first user so that the first user may learn and improve subsequent information inputs. As described herein, the notification may not be transmitted to the first user device 118 until it has been reviewed and/or approved by a third user (and/or any other user).

Figure 3:
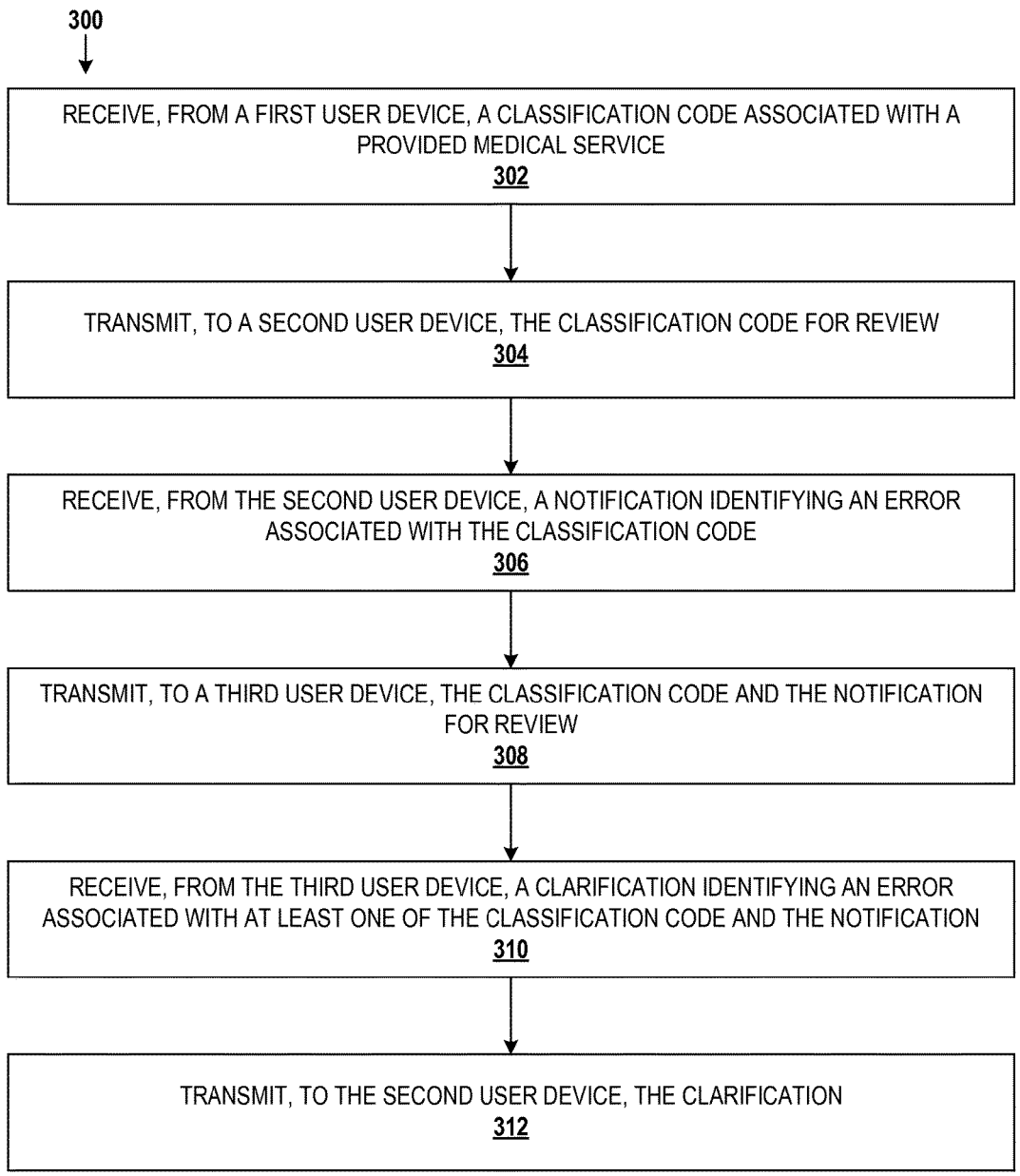
FIG. 3 shows an exemplary method of performing operations associated with the second module, in accordance with some embodiments of the disclosure.

FIG. 3 shows an exemplary method 300 for performing operations associated with the second module 110. For example, method 300 may correspond to operations performed using the load-balancing server 102 (e.g., the first module 108 and/or the second module 110), the first user device 118, the second user device 120, and/or the third user device 122. At block 302, the method 300 may include receiving, from the first user device, a classification code associated with a provided medical service. For example, the first user (e.g., a medical provider) may input information (e.g., a classification code, a narrative, and/or other information) associated with a provided medical service into the system 100 using the first user device 118, which then transmits the inputted information to the load-balancing server 102 for processing by the first module 108. At block 304, the method 300 may include transmitting, to the second user device, the classification code for review. For example, the first module 108 may transmit the inputted information associated with the provided medical service to the second user device 120 for review by the second user (e.g., a coder).

The process continues at block 306 of FIG. 3, where the method 300 may include receiving, from the second user device, a notification identifying an error associated with the classification code. For example, the second user, using the second user device 120, may review the inputted information to identify one or more errors associated with an inputted classification code and/or narrative. The notification may be generated by the second user device 120 after review of the inputted information is complete. The notification may be transmitted from the second user device 120 to the load-balancing server 102 for processing by the first module 108 and/or the second module 110 (and/or any other module described herein). At block 308, the method 300 may include transmitting, to a third user device, the classification code and the notification for review. For example, the second module 110, upon receipt of the notification, may transmit the notification to the third user device 122 for review by the third user (e.g., a supervisor). At block 310, the method 300 may include receiving, from the third user device, a clarification identifying an error associated with at least one of the classification code and the notification. For example, the third user, using the third user device 122, may review the inputted information and/or the generated notification to identify one or more errors associated with an inputted classification code, a narrative, and/or the notification (e.g., comments associated with the inputted information and provided by the second user). The clarification may be generated by the third user device 122 after review of the inputted information and/or the notification is complete. The clarification may be transmitted from the third user device 122 to the load-balancing server 102 for processing by the first module 108, the second module 110, and/or the third module 112 (and/or any other module described herein).

Still referring to FIG. 3, the method concludes at block 312, where the method 300 may include transmitting, to the second user device, the clarification. For example, the second module 110, upon receipt of the clarification from the third user device 122, may transmit the clarification to the second user device 120 so that the first user may review the clarification. In this manner, the clarification (e.g., comments associated with the inputted information and/or the notification) is provided to the second user so that the second user may learn from the clarification and improve subsequent information inputs, modifications, notification inputs, and/or the like. As described herein, the clarification may not be transmitted to the second user device 120 until it has been reviewed and/or approved by the third user (and/or another user). In some embodiments, the clarification is transmitted to the second user device 120 prior to transmission of the notification to the first user device 118 so that the second user has an opportunity to review, modify, and/or otherwise update the notification with information provided in the clarification. After the second user has reviewed the clarification and performed any necessary modifications to the inputted information, the inputted information (e.g., the inputted classification code) may be submitted to the load-balancing server 102 for billing and/or insurance processing.

Figure 4:
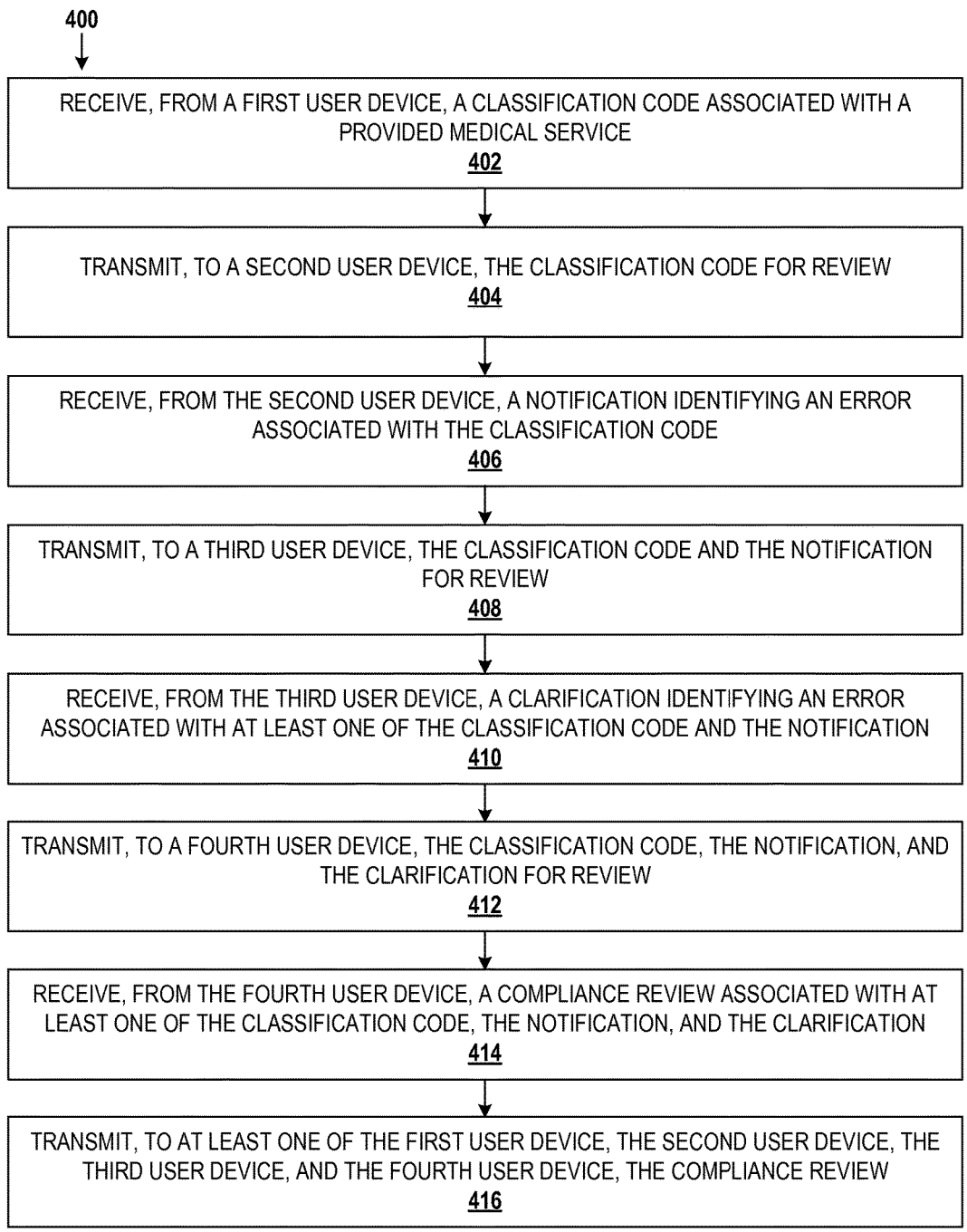
FIG. 4 shows an exemplary method of performing operations associated with the third module, in accordance with some embodiments of the disclosure.

FIG. 4 shows an exemplary method 400 for performing operations associated with the third module 112. For example, method 400 may correspond to operations performed using the load-balancing server 102 (e.g., the first module 108, the second module 110, and/or the third module 112), the first user device 118, the second user device 120, the third user device 122, and/or the fourth user device 124. At block 402, the method 400 may include receiving, from the first user device, a classification code associated with a provided medical service. For example, the first user (e.g., a medical provider) may input information (e.g., a classification code, a narrative, and/or other information) associated with a provided medical service into the system 100 using the first user device 118, which then transmits the inputted information to the load-balancing server 102 for processing by the first module 108. At block 404, the method 400 may include transmitting, to the second user device, the classification code for review. For example, the first module 108 may transmit the inputted information associated with the provided medical service to the second user device 120 for review by the second user (e.g., a coder).

With further reference to FIG. 4, the method continues at block 406, where the method 400 may include receiving, from the second user device, a notification identifying an error associated with the classification code. For example, the second user, using the second user device 120, may review the inputted information to identify one or more errors associated with an inputted classification code and/or narrative. The notification may be generated by the second user device 120 after review of the inputted information is complete. The notification may be transmitted from the second user device 120 to the load-balancing server 102 for processing by the first module 108 and/or the second module 110 (and/or any other module described herein). At block 408, the method 400 may include transmitting, to a third user device, the classification code and the notification for review. For example, the second module 110, upon receipt of the notification, may transmit the notification to the third user device 122 for review by the third user (e.g., a supervisor). At block 410, the method 400 may include receiving, from the third user device, a clarification identifying an error associated with at least one of the classification code and the notification. For example, the third user, using the third user device 122, may review the inputted information and/or the generated notification to identify one or more errors associated with an inputted classification code, a narrative, and/or the notification (e.g., comments associated with the inputted information and provided by the second user). The clarification may be generated by the third user device 122 after review of the inputted information and/or the notification is complete. The clarification may be transmitted from the third user device 122 to the load-balancing server 102 for processing by the first module 108, the second module 110, and/or the third module 112 (and/or any other module described herein).

The process continues at block 412 of FIG. 4, where the method 400 may include transmitting, to a fourth user device, the classification code, the notification, and/or the clarification for review. For example, the third module 112, upon receipt of the clarification from the third user device 122, may transmit the inputted information, the notification, and/or the clarification to the fourth user device 124 for review by the fourth user (e.g., an auditor). At block 414, the method 400 may include receiving, from the fourth user device, a compliance review identifying an error associated with at least one of the classification code, the notification, and the clarification. For example, the fourth user, using the fourth user device 124, may review the inputted information and/or the generated notification to identify one or more errors associated with an inputted classification code, a narrative, the notification (e.g., comments associated with the inputted information and provided by the second user), and/or the clarification (e.g., comments associated with the notification and provided by the third user). The compliance review may be generated by the fourth user device 124 after review of the inputted information, the notification, and/or the clarification is complete. The compliance review may be transmitted from the fourth user device 124 to the load-balancing server 102 for processing by the first module 108, the second module 110, the third module 112, and/or the fourth module 114 (and/or any other system). At block 416, the method 400 may include transmitting, to at least one of the first user device, the second user device, the third user device, and the fourth user device, the compliance review. For example, the third module 112 may transmit the compliance review to one or more of the first user device 118, the second user device 120, the third user device 122, and/or the fourth user device 124 for review by respective users of said user devices.

Figure 5:
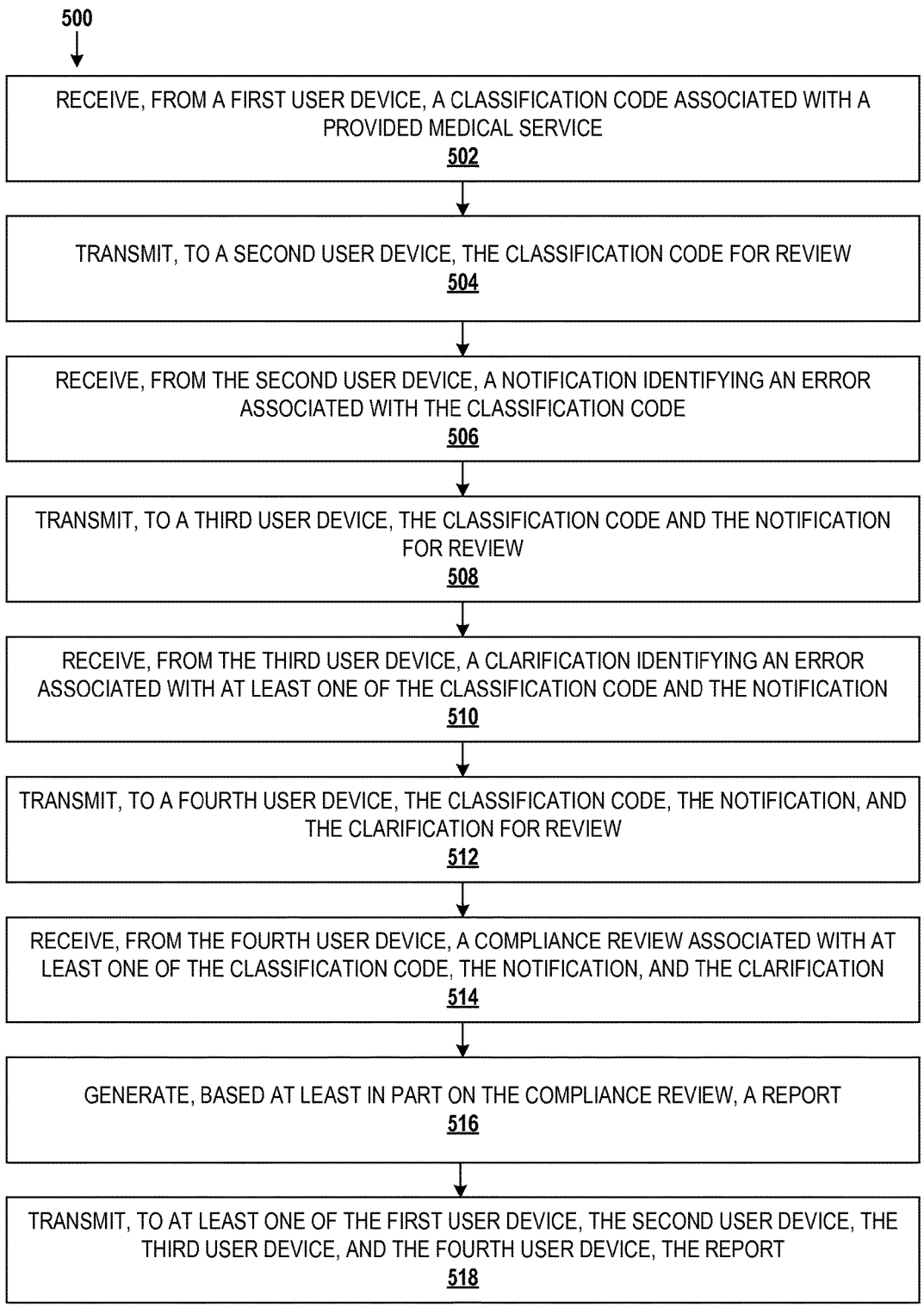
FIG. 5 shows an exemplary method of performing operations associated with the fourth module, in accordance with some embodiments of the disclosure.

FIG. 5 shows an exemplary method 500 for performing operations associated with the fourth module 114. For example, method 500 may correspond to operations performed using the load-balancing server 102 (e.g., the first module 108, the second module 110, the third module 112, and/or the fourth module 114), the first user device 118, the second user device 120, the third user device 122, and/or the fourth user device 124. At block 502, the method 500 may include receiving, from the first user device, a classification code associated with a provided medical service. For example, the first user (e.g., a medical provider) may input information (e.g., a classification code, a narrative, and/or other information) associated with a provided medical service into the system 100 using the first user device 118, which then transmits the inputted information to the load-balancing server 102 for processing by the first module 108. At block 504, the method 500 may include transmitting, to the second user device, the classification code for review. For example, the first module 108 may transmit the inputted information associated with the provided medical service to the second user device 120 for review by the second user (e.g., a coder).

With further reference to FIG. 5, the process continues at block 506, where the method 500 may include receiving, from the second user device, a notification identifying an error associated with the classification code. For example, the second user, using the second user device 120, may review the inputted information to identify one or more errors associated with an inputted classification code and/or narrative. The notification may be generated by the second user device 120 after review of the inputted information is complete. The notification may be transmitted from the second user device 120 to the load-balancing server 102 for processing by the first module 108 and/or the second module 110 (and/or any other module described herein). At block 508, the method 500 may include transmitting, to a third user device, the classification code and the notification for review. For example, the second module 110, upon receipt of the notification, may transmit the notification to the third user device 122 for review by the third user (e.g., a supervisor).

The process continues at block 510 of FIG. 5, where the method 500 may include receiving, from the third user device, a clarification identifying an error associated with at least one of the classification code and the notification. For example, the third user, using the third user device 122, may review the inputted information and/or the generated notification to identify one or more errors associated with an inputted classification code, a narrative, and/or the notification (e.g., comments associated with the inputted information and provided by the second user). The clarification may be generated by the third user device 122 after review of the inputted information and/or the notification is complete. The clarification may be transmitted from the third user device 122 to the load-balancing server 102 for processing by the first module 108, the second module 110, and/or the third module 112 (and/or any other module described herein).

Still referring to FIG. 5, the process continues at block 512, where the method 500 may include transmitting, to a fourth user device, the classification code, the notification, and/or the clarification for review. For example, the third module 112, upon receipt of the clarification from the third user device 122, may transmit the inputted information, the notification, and/or the clarification to the fourth user device 124 for review by the fourth user (e.g., an auditor). At block 514, the method 500 may include receiving, from the fourth user device, a compliance review identifying an error associated with at least one of the classification code, the notification, and the clarification. For example, the fourth user, using the fourth user device 124, may review the inputted information and/or the generated notification to identify one or more errors associated with an inputted classification code, a narrative, the notification (e.g., comments associated with the inputted information and provided by the second user), and/or the clarification (e.g., comments associated with the notification and provided by the third user). The compliance review may be generated by the fourth user device 124 after review of the inputted information, the notification, and/or the clarification is complete. The compliance review may be transmitted from the fourth user device 124 to the load-balancing server 102 for processing by the first module 108, the second module 110, the third module 112, and/or the fourth module 114 (and/or any other system).

The process depicted by FIG. 5 continues at block 516, where the method 500 may include generating, based at least in part on the compliance review, a report. For example, the fourth module 114 may utilize information included in the compliance review (and/or any other information stored in the one or more memories 104, another database, and/or the like) to generate the report. In some embodiments, the report may include a variety of analytics, charts, graphs, summaries, and/or the like so that results of the compliance review may be clearly and/or accurately communicated to a diverse audience. Information included in the report may be sorted, modified, and/or otherwise manipulated by one or more users as described herein. At block 518, the method 500 may include transmitting, to at least one of the first user device, the second user device, the third user device, and the fourth user device, the report. For example, upon generation, the report may be transmitted to the first user device 118, the second user device 120, the third user device 122, and/or the fourth user device 124 from the fourth module 114 for review by respective users. Additionally and/or alternatively, the report may be transmitted to another device external to the system 100. The report may also be stored in the one or more memories 104 and/or in another location.

Figure 6:
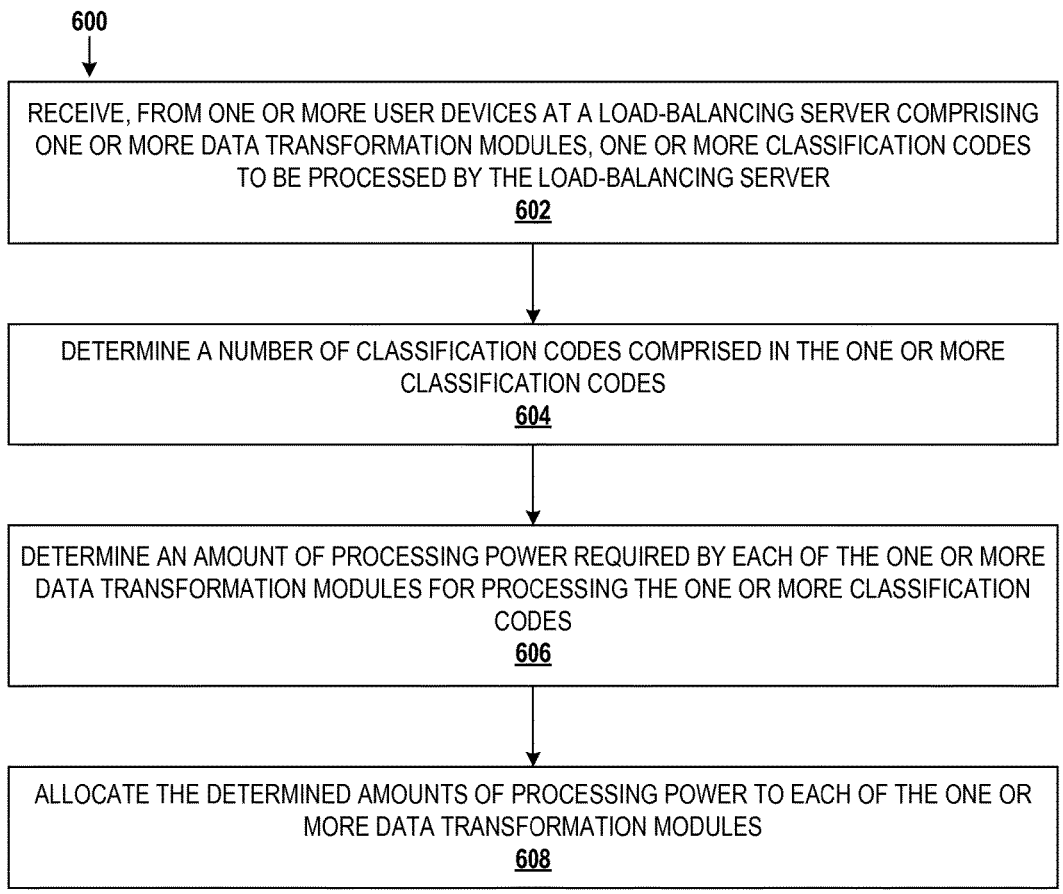
FIG. 6 shows an exemplary method of performing operations associated with the fifth module, in accordance with some embodiments of the disclosure.

FIG. 6 shows an exemplary method 600 for performing operations associated with the fifth module 116. For example, method 600 may correspond to operations performed using the load-balancing server 102 (e.g., the first module 108, the second module 110, the third module 112, the fourth module 114, and/or the fifth module), the first user device 118, the second user device 120, the third user device 122, and/or the fourth user device 124. At block 602, the method 600 may include receiving, from one or more user devices at a load-balancing server comprising one or more data transformation modules, one or more classification codes to be processed by the load-balancing server. For example, multiple classification codes (and/or narratives and/or other information associated with provided medical services) may be received by one or more of the modules of the load-balancing system 102 from one or more user devices.

With further reference to FIG. 6, the process continues at block 604, the method 600 may include determining a number of classification codes comprised in the one or more classification codes. For example, the fifth module 116 may count the number of incoming and/or inputted classification codes that are in the queue and ready to be processed. At block 606, the method 600 may include determining an amount of processing power required by each of the one or more data transformation modules for processing the one or more classification codes. For example, the fifth module 116 may determine minimum and/or maximum amounts of computing resources (e.g., processing power, memory, and/or the like) required, available, and/or currently utilized by each of the elements (e.g., the one or more memories 104, the one or more processors 106, the first module 108, the second module 110, the third module 112, the fourth module 114, and/or the fifth module 116) of the load-balancing server 102.

The process depicted by FIG. 6 concludes at block 608, where the method 600 may include allocating the determined amounts of processing power to each of the one or more data transformation modules. For example, the fifth module 116 may allocate various computing resources to each of the one or more memories 104, the one or more processors 106, the first module 108, the second module 110, the third module 112, the fourth module 114, and/or the fifth module 116 so as to maximize efficiency and/or meet required needs of each element for processing of the incoming and/or inputted classification codes. In this manner, computing resources may be allocated based on volume, time of day, a predetermined duration of time, a period of time available for processing, a type of processing required, and/or any other factor. The fifth module 116 may also be configured to determine one or more factors associated with computing resources, such as an amount of processing and/or type of processing required by one or more of the first module 108, the second module 110, the third module 112, and/or the fourth module 114.

Exemplary User Interface

FIG. 7 shows an exemplary report 700 generated by the fourth module. As described herein, the report 700 may be generated based on any information associated with a provided medical service. In some embodiments, the report 700 may include a name 702 associated with a provided medical service and/or a medical record such as a name of a first user (e.g., a medical provider), a second user (e.g., a coder), a third user (e.g., a supervisor), a fourth user (e.g., an auditor), and/or the like), and/or the like. In some embodiments, the report 700 may include a further comprises a history 704 of all actions taken by any of the first user, the second user, the third user, and/or the fourth user during processing of the classification code. For example, the history 704 may include a timestamp associated with an input of a classification code and/or narrative, a timestamp associated with an input of a notification, a timestamp associated with an input of a clarification, a timestamp associated with a submission of a clarification code, a timestamp associated with a compliance review, and/or the like.

Still referring to FIG. 7, in some embodiments, the report 700 may include a listing of all inputted clarification codes 706, as well as a listing of all submitted clarification codes 708, a inputted narrative 710, an inputted notification 712, an inputted clarification 714, and/or the like. In some embodiments, the report 700 may further include an evaluation 716 of any user (e.g., the user whose name is listed in the name 702 column). For example, the evaluation 716 may include an evaluation of a user's performance during processing of a classification code. The evaluation 716 may also include identification of one or more errors associated with processing of a classification code. For example, if a provided medical service was incorrectly coded, the fourth user may denote in the evaluation 716 column that the submitted classification code was incorrect, and may also provide a suggestion and/or a correct code for future and/or subsequent classification codes of similar provided medical services. In some embodiments, the evaluation may also include information such as a score, a grade, comments, and/or notes associated with any aspect of the processing of a classification code. This information may be used by any of the users to improve processing of future and/or subsequent classification codes.

CONCLUSIONS

While various implementations in accordance with the disclosed principles have been described above, it should be understood that they have been presented by way of example only, and are not limiting. Thus, the breadth and scope of the implementations should not be limited by any of the above-described exemplary implementations, but should be defined only in accordance with the claims and their equivalents issuing from this disclosure. Furthermore, the above advantages and features are provided in described implementations, but shall not limit the application of such issued claims to processes and structures accomplishing any or all of the above advantages.

Various terms used herein have special meanings within the present technical field. Whether a particular term should be construed as such a "term of art," depends on the context in which that term is used. "Connected to," "in communication with," "communicably linked to," "in communicable range of" or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the implementations set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any implementations in this disclosure. Neither is the "Summary" to be considered as a characterization of the implementations set forth in issued claims. Furthermore, any reference in this disclosure to "implementation" in the singular should not be used to argue that there is only a single point of novelty in this disclosure. Multiple implementations may be set forth according to the limitations of the multiple claims issuing from this disclosure, and such claims accordingly define the implementations, and their equivalents, that are protected thereby. In all instances, the scope of such claims shall be considered on their own merits in light of this disclosure, but should not be constrained by the headings herein.

What is claimed is:

1. A load-balancing server for allocating computing resources to a plurality of user devices across a computing network in response to an identified demand for the computing resources for processing medical service classification codes, the load-balancing server comprising:

at least one memory comprising instructions;

at least one processor configured for executing the instructions;

a plurality of medical services data transformation modules; and a load-balancing module coupled to each said medical services data transformation module, said at least one memory, and said at least one processor, wherein each said medical services data transformation module is configured to establish a digital communication connection over the computing network between the load-balancing server and the plurality of user devices, wherein said plurality of medical services data transformation modules comprise a medical services classification code analyzer configured to receive a request from a first user device of said plurality of user devices via the computing network for processing of a medical services classification code;

perform analysis of text associated with the received medical services classification code;

detect one or more errors based on said text associated with the received medical services classification code;

provide a recommended modification to said text; and output a notification to a second user device of said plurality of user devices, the notification comprising said received medical services classification code, said one or more detected errors, and said recommended modification;

a medical code notification receiver configured to receive said notification from said second user device and to output said received notification to a third user device of said plurality of user devices;

a clarification receiver configured to receive, from said third user device, said notification, the received medical services classification code, and clarification information associated with the notification; and transmit said notification, said received medical services classification code, and said clarification information associated with the notification to a further user device of said plurality of user devices, wherein said load-balancing module is configured to determine, based on a number indicating a volume of said requests for processing of said received medical services classification codes stored in a queue of said at least one memory, an amount of computing resources required by the plurality of medical services data transformation modules for processing of the received medical services classification codes;

determine an amount of computing resources available to the plurality of medical services data transformation modules, said computing resources comprising memory and processing power; and allocate the amount of computing resources required by each of the plurality of medical services data transformation modules for the processing of the received medical services classification code by performing one or more of, for at least one of said plurality of medical services data transformation modules, adjusting said processing power, adjusting memory size, partitioning a memory element, and controlling input from and/or output to said plurality of user devices so as to efficiently distribute the computing resources used by the plurality of medical services data transformation modules.

2. The load-balancing server of claim 1, wherein the user devices comprise a first user device, wherein the load-balancing server receives, from the first user device, a medical service classification code associated with a provided medical service, wherein the medical service classification code is inputted by a medical service provider via the first user device.

3. The load-balancing server of claim 2, wherein the user devices comprise a second user device, wherein the load-balancing server transmits the medical service classification code to the second user device for review by a coder of medical services.

4. The load-balancing server of claim 3, wherein the user devices comprise a third user device, wherein the load-balancing server transmits the medical service classification code and the notification to the third user device for review by a supervisor of the coder of medical services.

5. The load-balancing server of claim 4, wherein the load-balancing server receives, from the third user device, a clarification identifying an error associated with at least one of the medical service classification code and the notification.

6. The load-balancing server of claim 5, wherein the user devices comprise a fourth user device, wherein the load-balancing server transmits the medical service classification code, the notification, and the clarification to the fourth user device for review by an auditor.

7. The load-balancing server of claim 6, wherein the load-balancing server receives, from the fourth user device, a compliance review associated with at least one of the medical service classification code, the notification, and the clarification.

8. The load-balancing server of claim 7, wherein the load-balancing server transmits the compliance review to at least one of the first user device, the second user device, and the third user device.

9. The load-balancing server of claim 7, wherein the load-balancing server generates a report based at least in part on the compliance review.

10. The load-balancing server of claim 9, wherein the load-balancing server transmits the report to at least one of the first user device, the second user device, the third user device, and the fourth user device.

11. The load-balancing server of claim 1, wherein the medical service classification codes are associated with the International Statistical Classification of Diseases and Related Health Problems.

12. The load-balancing server of claim 1, wherein the medical service classification codes comprise ICD-9 codes or ICD-10 codes.

13. The load-balancing server of claim 1, wherein the medical service classification codes enable healthcare professionals or insurance companies to correctly identify, document, or bill respective provided services.

14. The load-balancing server of claim 1, wherein the processing of the medical service classification codes comprises at least one of real-time inputting, reviewing, auditing, or reporting respective provided services.

15. The load-balancing server of claim 1, wherein the load-balancing server includes separate application programming interfaces for communicating with the user devices and the at least one memory.

16. The load-balancing server of claim 1, wherein the medical services classification code analyzer is further configured to transform the received medical services classification code from a first format to a second format.

17. A method for allocating computing resources, using a load-balancing server, to a plurality of user devices across a computing network in response to an identified demand for the computing resources for processing medical service classification codes, the method comprising:
    establishing a digital communication connection over the computing network between the load-balancing server and the plurality of user devices;
    receiving, by a medical services classification code analyzer, via the computing network, a request from a first user device of the plurality of user devices for the processing of a medical service classification code;
    performing, by the medical services classification code analyzer, analysis of text associated with the received medical services classification code;
    detecting, by the medical services classification code analyzer, one or more errors based on said text associated with the received medical services classification code;
    providing, by the medical services classification code analyzer, a recommended modification to said text;
    outputting a notification, by the medical services classification code analyzer, to a second user device of said plurality of user devices, the notification comprising said received medical services classification code, said one or more detected errors, and said recommended modification;
    receiving, by a medical code notification receiver, said notification from said second user device;
    outputting, by said medical code notification receiver, said received notification to a third user device of said plurality of user devices;
    receiving, by a clarification receiver from said third user device, said notification, the received medical services classification code, and clarification information associated with the notification;
    transmitting, by said clarification receiver, said notification, said received medical services classification code, and said clarification information associated with the notification to a further user device of said plurality of user devices;
    determining, by a load-balancing module based on a number indicating a volume of said requests for processing of said received medical services classification codes stored in a queue of at least one memory of said load-balancing server, an amount of computing resources required by the medical services classification code analyzer, the medical code notification receiver, and the clarification receiver for the processing of the received medical services classification codes;
    determining, by said load-balancing module, an amount of computing resources available to the medical services classification code analyzer, the medical code notification receiver, and the clarification receiver, said computing resources comprising memory and processing power; and allocating, by said load-balancing module, the amount of computing resources required by each of medical services classification code analyzer, the medical code notification receiver, and the clarification receiver for the processing of the received medical services classification codes, said allocating comprising one or more of, by said load-balancing module, adjusting said processing power, adjusting memory size, partitioning a memory element, and controlling input from and/or output to said plurality of user devices so as to efficiently distribute the computing resources used by the medical services classification code analyzer, the medical code notification receiver, and the clarification receiver.

18. The method of claim 17, further comprising transforming the received medical services classification code from a first format to a second format.

19. A system comprising:
a load-balancing server configured for allocating computing resources to a plurality of user devices across a computing network in response to an identified demand for the computing resources for processing medical service classification codes, the load-balancing server comprising
at least one memory comprising instructions;
at least one processor configured for executing the instructions;
a plurality of medical services data transformation modules; and
a load-balancing module coupled to each said medical services data transformation module, said at least one memory, and said at least one processor,
wherein each said medical services data transformation module is configured to establish a digital communication connection over the computing network between the load-balancing server and the plurality of user devices,
wherein said plurality of medical services data transformation modules comprise
a medical services classification code analyzer configured to
receiver a request from a first user device of said plurality of user devices via the computing network for processing of a medical services classification code;
perform analysis of text associated with the received medical services classification code;
detect one or more errors based on said text associated with the received medical services classification code;
provide a recommended modification to said text; and
output a notification to a second user device of said plurality of user devices, the notification comprising said received medical services classification code, said one or more detected errors, and said recommended modification;
a medical code notification receiver configured to receive said notification from said second user device and to output said received notification to a third user device of said plurality of user devices;
a clarification receiver configured to
receive, from said third user device, said notification, the received medical services classification code, and clarification information associated with the notification; and
transmit said notification, said received medical services classification code, and said clarification information associated with the notification to a further user device of said plurality of user devices,
wherein said load-balancing module is configured to
determine, based on a number indicating a volume of said requests for processing of said received medical services classification codes stored in a queue of said at least one memory, an amount of computing resources required by the plurality of medical services data transformation modules for processing of the received medical services classification codes;
determine an amount of computing resources available to the plurality of medical services data transformation modules, said computing resources comprising memory and processing power, and
allocate the amount of computing resources required by each of the plurality of medical services data transformation modules for the processing of the received medical services classification codes by performing one or more of, for at least one of said plurality of medical services data transformation modules, adjusting said processing power, adjusting memory size, partitioning a memory element, and controlling input from and/or output to said plurality of user devices so as to efficiently distribute the computing resources used by the plurality of medical services data transformation modules.

20. The system of claim 19, wherein the medical services classification code analyzer is further configured to transform the received medical services classification code from a first format to a second format.

* * * * *